Figure 1:
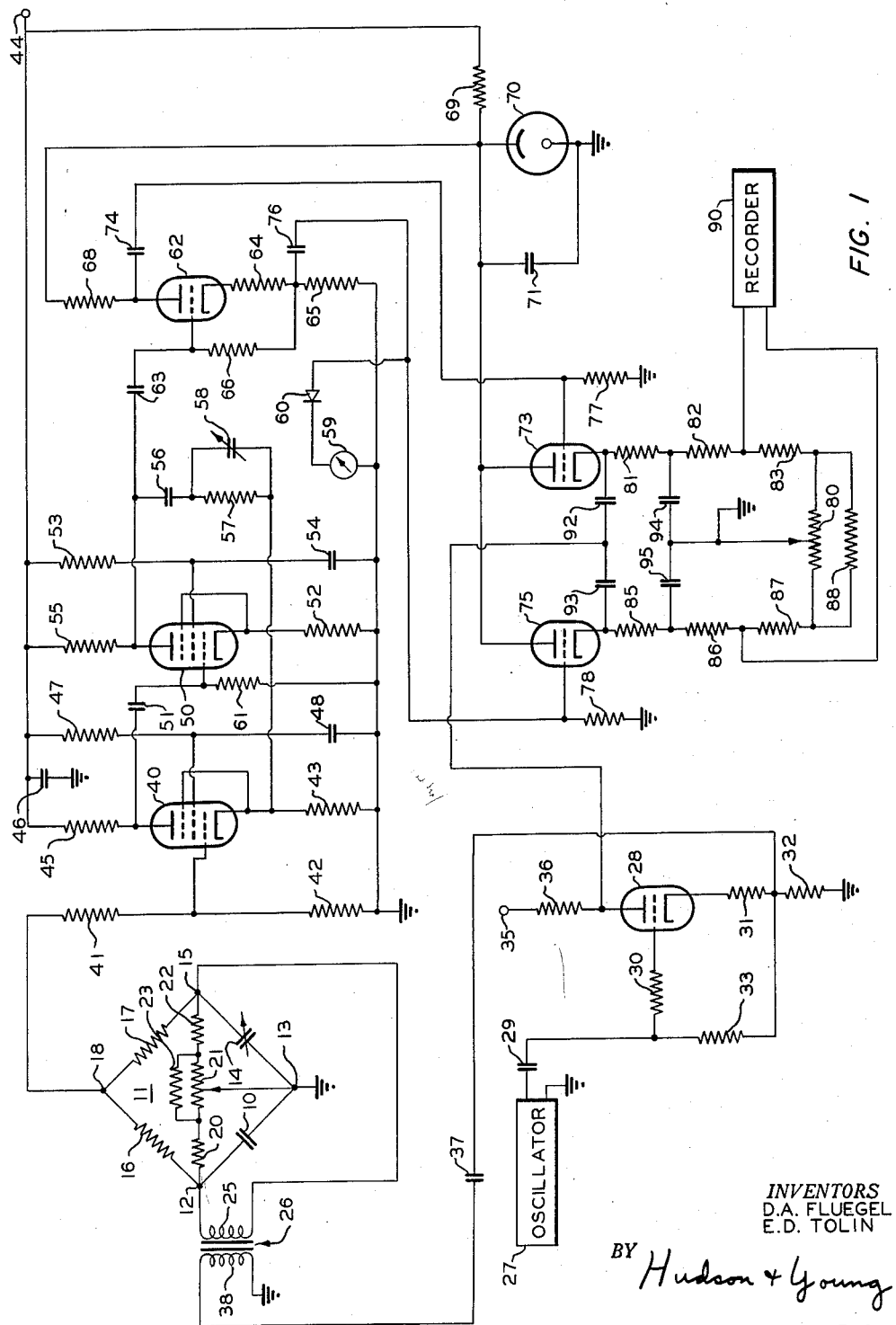

May 2, 1961   D. A. FLUEGEL ET AL   2,982,911
ELECTRICAL MEASURING APPARATUS
Filed Jan. 26, 1956   2 Sheets-Sheet 1

INVENTORS
D.A. FLUEGEL
E.D. TOLIN
BY Hudson & Young
ATTORNEYS

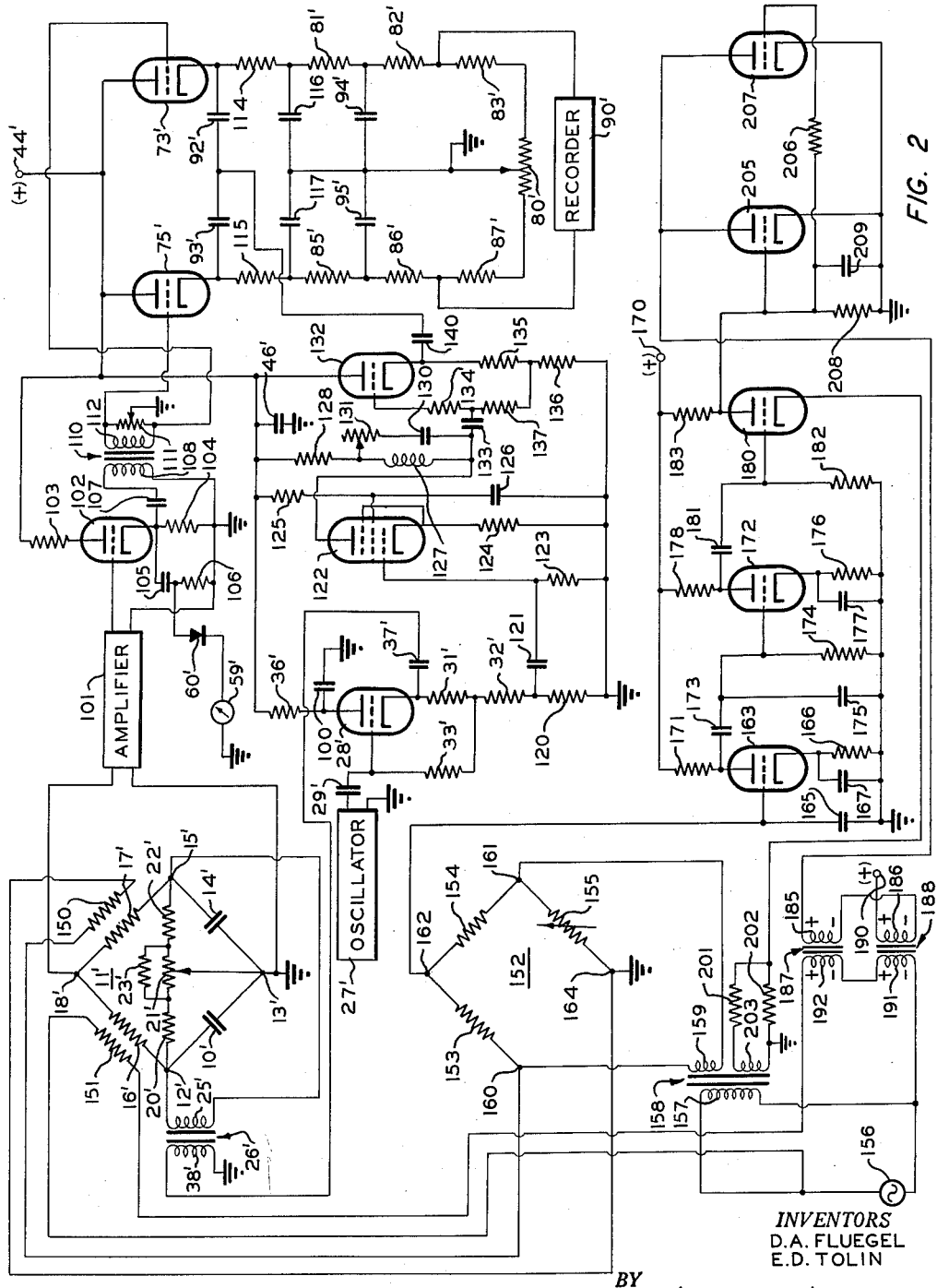

United States Patent Office 2,982,911
Patented May 2, 1961

2,982,911
ELECTRICAL MEASURING APPARATUS
Dale A. Fluegel and Ernest D. Tolin, Bartlesville, Okla., assignors to Phillips Petroleum Company, a corporation of Delaware
Filed Jan. 26, 1956, Ser. No. 561,394
8 Claims. (Cl. 324—60)

This invention relates to the detection and analysis of materials in terms of the dielectric properties thereof. In another aspect it relates to apparatus for maintaining regions of constant temperature.

The measurement of the dielectric properties of materials has become a valuable industrial and laboratory procedure for determining compositions. A detecting element in the form of an electrical condenser is disposed so that the material to be measured forms the dielectric. A measurement of the capacitance of the condenser thus provides information regarding the properties of the test material. This procedure can be employed to detect liquid levels, the moisture content of materials, the composition of materials, and the thickness of sheets of the materials, for example. The accuracy of the measurement depends to a large extent on the accuracy of the measurement of the capacitance of the resulting condenser.

In accordance with the present invention, improved apparatus is provided for detecting and analyzing materials in terms of the dielectric properties thereof. The material to be measured forms the dielectric of a condenser which is connected in one arm of a bridge network. An alternating potential is applied across first opposite terminals of the bridge network. A reference signal from the same source is applied to the first input of a phase detector. The output signal from the bridge network is applied to the second input of the phase detector. It is generally desirable to incorporate a phase shift network in one of the input circuits of the phase detector to provide a more sensitive measurement of capacitance.

In some applications of such apparatus to measure the dielectric properties of test materials, it has been found necessary to maintain the bridge network at a constant temperature. This is accomplished by positioning a temperature sensitive impedance element in thermal contact with the bridge network. This elment is connected in a detecting circuit which controls the current through the first winding of a saturable reactor, and thus the impedance of the second winding. A heating element is also positioned in thermal contact with the bridge network. This heating element is connected in circuit with the secondary winding of the saturable reactor and a source of alternating current. The current supplied to the heating element is thus regulated in response to changes in temperature of the sensing element so that sufficient heat is supplied to the bridge network to maintain a constant temperature.

Accordingly, it is an object of this invention to provide improved apparatus for measuring the capacitance of a condenser.

Another object is to provide improved apparatus for detecting and analyzing materials in terms of the dielectric properties thereof.

A further object is to provide apparatus for maintaining regions of constant temperature.

Other objects, advantages and features of the invention should become apparent from the following detailed description taken in conjunction with the accompanying drawing in which:

Figure 1 is a schematic circuit diagram of a first embodiment of the apparatus of this invention; and
Figure 2 is a schematic circuit diagram of a second embodiment of the apparatus of this invention.

Referring now to the drawing in detail and to Figure 1 in particular, there is shown a capacitor 10 which comprises the detecting element employed to measure the dielectric properties of a test material. This capacitor can be of various configurations, depending upon the particular application of the instrument. If the thickness of a sheet of material is to be measured, the capacitor can be in the form of a pair of spaced plates having the test material therebetween. In detecting liquid levels, it is convenient to employ an elongated probe element which comprises an open cylinder having a second electrode disposed axially therein. Detecting element 10 obviously can be in the form of two or more spaced electrodes. Two specific examples of suitable measuring elements are described in the copending application of J. R. Parsons, Serial No. 376,960, filed August 27, 1953, now Patent No. 2,904,751.

Capacitor 10 is connected in a bridge network 11. The two terminals of capacitor 10 are connected to respective terminals 12 and 13 of the bridge. An adjustable reference capacitor 14 is connected between terminal 13 and a third terminal 15. Resistors 16 and 17 are connected in series relationship between terminals 12 and 15. The junction between these resistors is designated as terminal 18. A resistor 20, a potentiometer 21 and a resistor 22 are connected in series relationship between terminals 12 and 15. A resistor 23 is connected in parallel with potentiometer 21. The contactor of potentiometer 21 is connected to terminal 13, which in turn is connected to ground. Bridge terminals 12 and 15 are connected to the respective end terminals of the secondary winding 25 of a transformer 26.

Transformer 26 is energized from the output of an oscillator 27. The first output terminal of oscillator 27 is connected to the control grid of a triode 28 through a capacitor 29 and a resistor 30 which are connected in series relationship. The cathode of triode 28 is connected to ground through series connected resistors 31 and 32. The junction between resistor 30 and capacitor 29 is connected to the junction between resistors 31 and 32 by a resistor 33. The anode of triode 28 is connected to a positive potential terminal 35 through a resistor 36. The junction between resistors 31 and 32 is connected through a capacitor 37 to one terminal of the primary winding 38 of transformer 26. The second terminal of transformer winding 38 is connected to ground.

Output terminal 18 of bridge network 11 is connected to the control grid of a pentode 40 through a resistor 41. The control grid of pentode 40 is connected to ground through a resistor 42. The cathode and suppressor grid of pentode 40 are connected to ground through a resistor 43. The anode of pentode 40 is connected to a positive potential terminal 44 through a resistor 45. A capacitor 46 is connected between terminal 44 and ground. The screen grid of pentode 40 is connected to terminal 44 through a resistor 47 and to ground through a capacitor 48. The anode of pentode 40 is also connected to the control grid of a pentode 50 through a capacitor 51. A resistor 61 is connected between the control grid of pentode 50 and ground. The cathode and suppressor grid of pentode 50 are connected to ground through a resistor 52. The screen grid of pentode 50 is connected to terminal 44 through a resistor 53 and to ground through a capacitor 54. The anode of pentode 50 is connected to terminal 44 through a resistor 55.

The anode of pentode 50 is also connected to the cathode of pentode 40 through a feedback network which comprises a capacitor 56 and a resistor 57 which are connected in series relationship. A variable capacitor 58 is connected in parallel with resistor 57 to change the phase of the feedback signal.

The anode of pentode 50 is connected to the control grid of a triode 62 through a capacitor 63. The cathode of triode 62 is connected to ground through series connected resistors 64 and 65. The control grid of triode 62 is connected to ground through series connected resistors 66 and 65. The anode of triode 62 is connected to terminal 44 through series connected resistors 68 and 69. A voltage regulating tube 70 is connected between ground and the junction between resistors 68 and 69, and a capacitor 71 is connected in parallel with this tube.

The anode of triode 62 is also connected to the control grid of a triode 73 through a capacitor 74. The junction between resistors 64 and 65 is connected to the control grid of a tridoe 75 through a capacitor 76. The control grids of triodes 73 and 75 are connected to ground through respective resistors 77 and 78. A null detecting meter 59 is connected between ground and the grid of triode 75 through rectifier 60. The anodes of triodes 73 and 75 are connected to one another and to terminal 44 through resistor 69. The cathode of triode 73 is connected to the first end terminal of a potentiometer 80 through series connected resistors 81, 82 and 83. The cathode of triode 75 is connected to the second end terminal of potentiometer 80 through series connected resistors 85, 86 and 87. The contactor of potentiometer 80 is connected to ground. A resistor 88 is connected in parallel with potentiometer 80. The junction between resistors 82 and 83 is connected to the first input terminal of a recorder 90, and the junction between resistors 86 and 87 is connected to the second input terminal of recorder 90. The anode of triode 28 is connected to the cathodes of triodes 73 and 75 through respective capacitors 92 and 93. A capacitor 94 is connected between ground and the junction between resistors 81 and 82, and a capacitor 95 is connected between ground and the junction between resistors 85 and 86.

The operation of the apparatus of Figure 1 will now be described. The output of oscillator 27 is applied through cathode follower 28 and transformer 26 across terminals 12 and 15 of bridge network 11. It should be evident that this network forms a capacity bridge. If the bridge is balanced there is a zero potential difference between terminals 13 and 18. However, any unbalance of the bridge due to a change in capacitance of element 10 results in the potential at terminal 18 changing from ground potential. Also, any unbalance in the resistance arm including resistors 20, 21, 22 and 23 or any change in the loss factor of the material in condenser 10 results in the potential at terminal 18 changing from ground potential. This latter potential is 90° out of phase with the potential due to a change in capacity of condenser 10. This potential is applied to the grid of pentode 40. Any unbalance signal is amplified by pentodes 40 and 50 and applied to the control grid of triode 62. Triode 62 provides two output signals which are 180° out of phase with one another. These two signals are applied to the control grids of triodes 73 and 75, respectively. Triodes 73 and 75 and the associated circuit form a phase sensitive detector. A reference signal is applied to the cathodes of these tubes from the output of triode 28. The two signals applied to the phase detector network are thus of the same frequency because they are both obtained from oscillator 27. The currents through the two triodes are functions of the amplitudes of the signals applied to the control grids and the phases of these signals with respect to the reference signal applied to the cathodes. The resistors and capacitors in the cathode circuits of the two triodes filter the currents through the triodes. If the capacitance of capacitor 10 should become greater than that of capacitor 14, bridge network 11 is unbalanced in a first direction. If the capacitance of capacitor 10 becomes less than that of capacitor 14 the bridge is unbalanced in the opposite direction. The phase of the output signal from the bridge thus changes by 180° when the direction of the unbalance changes.

Bridge network 11 is balanced initially by varying capacitor 14 and potentiometer 21 until the recorder reads zero, or a predetermined value as determined by the setting of the contactor of potentiometer 80, when a reference material is disposed between the plates of capacitor 10. The contactor of potentiometer 21 alone is then moved to determine if the signal applied to recorder 90 changes. If a change is observed, capacitor 58 is varied to change the phase of the signal applied to the control grid of triode 62. Adjustment of capacitor 58 is continued to restore the recorder to the initial value. The contactor of potentiometer 21 is then adjusted until the reading of meter 59 is zero, which indicates that there is a zero potential difference between bridge terminals 13 and 18. At this final point, any further change of the position of the contactor of potentiometer 21 does not change the recorder reading. The bridge circuit is then balanced and the apparatus is ready to be operated. Any change in capacitance of capacitor 10 results in a change in the signal applied to recorder 90. If desired, this signal can be employed to operate suitable control equipment to adjust a process variable so that the material being tested retains a desired dielectric constant.

In Figure 2 there is illustrated a second embodiment of the electrical measuring apparatus of this invention. The apparatus of Figure 2 is similar to that of Figure 1 in many respects and corresponding elements are designated by the like primed reference numerals. Capacitor 14' of bridge network 11', is not shown as being adjustable. In some applications of the measuring apparatus of this invention it is desirable to compare the dielectric of a test material with that of a similar reference material. Two identical condensers 10' and 14' can be provided with the two materials forming the respective dielectrics thereof. The bridge network 11' is energized from an oscillator 27' having a cathode follower 28' and the output circuit thereof. A capacitor 100 is connected between the anode of triode 28' and the ground.

Output terminals 18' and 13' of bridge network 11' are are connected to the respective input terminals of an amplifier 101. The first output terminal of amplifier 101 is connected to the control grid of a triode 102. The anode of triode 102 is connected to a potential terminal 44' through a resistor 103. The cathode of triode 102 is connected to ground through a resistor 104. The cathode of triode 102 is also connected to ground through a capacitor 105 and a resistor 106 which are connected in series relationship. The junction between these elements is connected to the first terminal of rectifier 60'. The cathode of triode 102 is also connected through a capacitor 107 to the first terminal of the primary winding 108 of a transformer 110. The second terminal of transformer winding 108 is connected to ground. A potentiometer 111 is connected across the secondary winding 112 of transformer 110. The contactor of potentiometer 111 is connected to ground. The end terminals of transformer winding 112 are connected to the respective control grids of triodes 73' and 75' of the phase detector. The phase detector circuit is generally similar to that illustrated in Figure 1 except that additional filter resistors 114 and 115 and capacitors 116 and 117 are connected in the cathode circuits of the two triodes.

A third resistor 120 is connected in the cathode circuit of triode 28'. The junction between resistors 32' and 120 is connected through a capacitor 121 to the control grid of a pentode 122. The control grid of pentode 122 is connected to ground through a resistor 123. The cathode and the suppressor grid of pentode 122 are connected to ground through a resistor 124. The screen grid of pentode 122 is connected to terminal 44' through a resistor 125 and to ground through a capacitor 126.

The anode of pentode 122 is connected to terminal 44' through an inductor 127 and a resistor 128 which are connected in series relationship. A capacitor 130 and a variable resistor 131 are connected in series relationship with one another in parallel with inductor 127. The anode of pentode 122 is also connected to the control grid of a triode 132 through a capacitor 133 and a resistor 134 which are connected in series relationship. The anode of triode 132 is connected to terminal 44'. The cathode of triode 132 is connected to ground through series connected resistors 135 and 136. The junction between capacitor 133 and resistor 134 is connected through a resistor 137 to the junction between resistors 135 and 136. The cathode of triode 132 is connected through series connected capacitors 140 and 92' to the cathode of triode 73'. The cathode of triode 132 is also connected through series connected capacitors 140 and 93' to the cathode of triode 75.

The basic operation of the network shown in Figure 2 is the same as that of the network of Figure 1. The only major difference between the two circuits is that the phase shift network of Figure 2 is incorporated in the circuit between the oscillator and the phase detector. This phase shift network is in the anode circuit of pentode 122. The phase of the reference signal applied to the phase detector is adjusted by varying resistor 131.

As previously mentioned, it has been found to be important in some operations to maintain bridge network 11' at an absolutely constant temperature. This is provided in the circuit of Figure 2 by means of a temperature sensitive resistance element 150 and a heating element 151 which are positioned in thermal contact with the bridge network. Element 150 is connected in one arm of a Wheatstone bridge circuit 152 which is formed by additional resistors 153, 154 and 155. A source of alternating current 156 is connected to the primary winding 157 of a transformer 158. The first secondary winding 159 of transformer 158 is connected across first opposite terminals 160 and 161 of bridge 152. The third terminal 162 of the bridge is connected to the control grid of a triode 163, and the fourth terminal 164 of the bridge is connected to ground.

The control grid of triode 163 is connected to ground through a capacitor 165. The cathode of triode 163 is connected to ground through a resistor 166 which is shunted by a capacitor 167. The anode of triode 163 is connected to a positive potential terminal 170 through a resistor 171. The anode of triode 163 is also connected to the control grid of a triode 172 through a capacitor 173. The control grid of triode 173 is connected to ground through a resistor 174 which is shunted by a capacitor 175. The cathode of triode 172 is connected to ground through a resistor 176 which is shunted by a capacitor 177. The anode of triode 172 is connected to terminal 170 through a resistor 178. The anode of triode 172 is also connected to the control grid of a triode 180 through a capacitor 181. The control grid of triode 180 is connected to ground through a resistor 182.

The anode of triode 180 is connected to terminal 170 through a resistor 183. The cathode of triode 180 is connected through resistors 201 and 202 to the respective end terminals of a secondary winding 203 of transformer 158. One end terminal of winding 203 is connected to ground. Transformer winding 203 and resistors 201 and 202 provide a reference potential at the cathode of triode 180. The anode of triode 180 is also connected directly to the control grid of a triode 205 and through a resistor 206 to the control grid of a triode 207. The control grid of triode 205 is connected to ground through a resistor 208 which is shunted by a capacitor 209. The cathodes of triodes 205 and 207 are connected to ground. The anodes of triodes 205 and 207 are connected to one another and through transformer windings 185 and 186 of respective transformers 187 and 188 to a terminal 190 which is maintained at a positive potential of lesser magnitude that the potential at terminal 170. Current source 156 is connected in series with windings 191 and 192 of respective transformers 188 and 187 and heating element 151. Transformer windings 185 and 186 are connected in opposition, as illustrated, so that there is no alternating signal induced across these two windings.

The potential difference between terminals 162 and 164 of bridge 152 is a function of the resistance of element 150, which in turn is a function of the temperature in the region of bridge network 11'. Element 150 has a negative coefficient of thermal resistivity in the illustrated embodiment of this invention. If the resistance of element 150 should change due to a temperature change, a potential is developed between terminals 162 and 164 of the bridge network which is a function of the temperature change. This signal is amplified by triodes 163 and 172 and applied to the control grid of triode 180 to control the conduction through triode 180 and thus the current through transformer windings 185 and 186. Transformers 187 and 188 function as a saturable reactor whereby the current through windings 185 and 186 determines the impedance of windings 191 and 192. This impedance controls the A.C. current through the two windings and through heating element 151. An increase in current through windings 185 and 186 decreases the impedance of windings 191 and 192 to increase the current through element 151. The detecting circuit is calibrated so that sufficient current is supplied to heater 151 to maintain the bridge network at a desired temperature.

It should be evident that the temperature control circuit of Figure 2 can be employed equally well in conjunction with the measuring apparatus of Figure 1. It should further be evident that this temperature control circuit is useful independently of the particular measuring apparatus shown in Figures 1 and 2. Any desired region can be maintained at a constant temperature by the use of heating element 151 and temperature sensitive resistance element 150.

From the foregoing description it should be apparent that there is provided in accordance with this invention improved apparatus for measuring the capacitance of a sample material. Apparatus is also provided for maintaining regions of constant temperature. While the invention has been described in conjunction with the present preferred embodiments it should be evident that it is not limited thereto.

What is claimed is:

1. Electrical measuring apparatus comprising first and second capacitors connected in series relationship between first and second terminals, first and second resistors connected in series relationship between said first and second terminals, a potentiometer having one end terminal connected to said first terminal and the other end terminal connected to said second terminal, means for connecting the contactor of said potentiometer to the junction between said capacitors, an oscillator, means for connecting the output terminals of said oscillator to said first and second terminals, respectively, an amplifier having an adjustable phase shift network therein, means for connecting the input terminals of said amplifier to the junctions between said capacitors and said resistors, respectively, a phase detector, means for connecting the output terminals of said amplifier to the first input of said phase detector, means for connecting the output terminals of said oscillator to the second input of said phase detector, and indicating means connected to the output of said phase detector.

2. Electrical measuring apparatus comprising first and second capacitors connected in series relationship between first and second terminals, first and second resistors connected in series relationship between said first and second terminals, a potentiometer having one end terminal connected to said first terminal and the other end terminal connected to said second terminal, means for connecting the contactor of said potentiometer to the junction between said capacitors, an oscillator, means for connecting the output terminals of said oscillator to said first and second terminals, respectively, an amplifier, means for connecting the input terminals of said amplifier to the junctions between said capacitors and said resistors, respectively, a phase detector, means for connecting the output terminals of said amplifier to the first input of said phase detector, an adjustable phase shift network, means for connecting the output terminals of said oscillator to the input of said phase shift network, means connecting the output of said phase shift network to the second input of said phase detector, and indicating means connected to the output of said phase detector.

3. Electrical measuring apparatus comprising a bridge network having as first and second branches thereof a pair of capacitive elements connected in series between first opposite terminals, a source of alternating potential, first circuit means for connecting said source across said first opposite terminals of said bridge network, a phase detector, second circuit means for connecting second opposite terminals of said bridge network to the first input of said phase detector, third circuit means for connecting said source to the second input of said phase detector, indicating means connected to the output of said phase detector, a temperature sensing element positioned in thermal contact with said bridge network, a heating element positioned in thermal contact with said bridge network, and means responsive to said temperature sensing element to control said heating element to supply sufficient heat to said bridge network to maintain said network at a constant temperature.

4. Electrical measuring apparatus comprising a bridge network having as first and second branches thereof a pair of capacitive elements connected in series between first opposite terminals, a source of alternating potential, first circuit means for connecting said source across said first opposite terminals of said bridge network, a phase detector, second circuit means for connecting second opposite terminals of said bridge network to the first input of said phase detector, third circuit means for connecting said source to the second input of said phase detector, indicating means connected to the output of said phase detector, a temperature sensitive impedance element positioned in thermal contact with said bridge network, an electrical heating element, a saturable reactor, a current source connected in circuit with said heating element and said reactor, and means responsive to changes in impedance of said temperature sensitive element to change the impedance of said reactor so that sufficient current is supplied to said heating element to maintain said network at a constant temperature.

5. Electrical measuring apparatus comprising a bridge network having as first and second branches thereof a pair of capacitive elements connected in series between first opposite terminals, a source of alternating potential, first circuit means for connecting said source across said first opposite terminals of said bridge network, a phase detector, second circuit means for connecting second opposite terminals of said bridge network to the first input of said phase detector, third circuit means for connecting said source to the second input of said phase detector, indicating means connected to the output of said phase detector, a temperature sensitive impedance element positioned in thermal contact with said bridge network, an electrical heating element, first and second transformers, a source of alternating current connected in series relationship with said heating element and the primary windings of said transformers, a source of direct current connected in circuit with the secondary windings of said transformers, the windings of said transformers being connected so that a zero potential is induced across the circuit of said secondary windings by alternating current through said primary windings, and means responsive to changes in impedance of said temperature sensitive element to vary the direct current through said secondary windings to change the impedance of said primary windings so that sufficient current is supplied to said heating element to maintain said network at a constant temperature.

6. The combination in accordance with claim 5 wherein said last-mentioned means comprises a second bridge network having said temperature sensitive element connected in one arm thereof, a variable impedance element connected in circuit with said source of direct current and said secondary windings, and means responsive to the output of said second bridge network to vary said impedance element.

7. Electrical measuring apparatus comprising a bridge network that includes first and second capacitors connected in series relationship between first opposite terminals, first and second resistors connected in series relationship between said first terminals, a potentiometer having the end terminals thereof connected between said first terminals, and means connecting the contactor of said potentiometer to the junction between said capacitors, the respective junctions between said capacitors and said resistors forming second opposite terminals; a source of alternating potential; first circuit means for connecting said source across said first terminals of said bridge network; a phase detector; second circuit means for connecting said second terminals of said bridge network to the first input of said phase detector; third circuit means for connecting said source to the second input of said phase detector; an adjustable phase shift network incorporated in one of said second and third circuit means; and means for indicating connected to the output of said phase detector.

8. Electrical measuring apparatus comprising a bridge network having as first and second branches a pair of capacitive elements separated by one of the pair of the hereinafter claimed second opposite terminals connected in series between first opposite terminals therein; a source of alternating potential; first circuit means for connecting said source across said first terminals of said bridge network; a phase detector that includes first and second tubes each having a cathode, an anode and a control grid, means for applying a first potential to the anodes of said tubes, a potentiometer, means for applying a second potential to the contactor of said potentiometer which is negative with respect to said first potential, a first filter network connected between the first end terminal of said potentiometer and the cathode of said first tube, and a second filter network connected between the second end terminal of said potentiometer and the cathode of said second tube; second circuit means for connecting second opposite terminals of said bridge network to the control grids of said first and second tubes; third circuit means for connecting said source to the cathodes of said first and second tubes; an adjustable phase shift network incorporated in one of said second and third circuit means; and means for indicating connected to the output of said phase detector.

References Cited in the file of this patent
UNITED STATES PATENTS

| | | |
|---|---|---|
| 2,476,496 | Kliever | July 19, 1949 |
| 2,593,766 | Kimball et al. | Apr. 22, 1952 |
| 2,599,583 | Robinson et al. | June 10, 1952 |
| 2,654,067 | Bruce | Sept. 29, 1953 |
| 2,702,948 | Seney | Mar. 1, 1955 |
| 2,721,975 | Wojciechowski | Oct. 25, 1955 |
| 2,724,040 | Mouzon | Nov. 15, 1955 |
| 2,752,473 | Hage | June 26, 1956 |
| 2,765,441 | Gambrill | Oct. 2, 1956 |
| 2,767,295 | Cutler | Oct. 16, 1956 |
| 2,767,296 | Welch | Oct. 16, 1956 |
| 2,826,738 | Lupfer | Mar. 11, 1958 |

OTHER REFERENCES

Journal of Scientific Instruments, vol. 24, No. 10, October 1947, pp. 258–259.